US007003644B2

(12) United States Patent
Heath et al.

(10) Patent No.: US 7,003,644 B2
(45) Date of Patent: Feb. 21, 2006

(54) EXECUTION TIME DEPENDENT COMMAND SCHEDULE OPTIMIZATION

(75) Inventors: Mark A. Heath, Oklahoma City, OK (US); Kenny T. Coker, Mustang, OK (US)

(73) Assignee: Seagate Technology LLC, Scotts Valley, CA (US)

(*) Notice: Subject to any disclaimer, the term of this patent is extended or adjusted under 35 U.S.C. 154(b) by 258 days.

(21) Appl. No.: 10/280,488

(22) Filed: Oct. 25, 2002

(65) Prior Publication Data

US 2003/0188092 A1    Oct. 2, 2003

Related U.S. Application Data

(60) Provisional application No. 60/368,217, filed on Mar. 28, 2002.

(51) Int. Cl.
    G06F 12/00    (2006.01)
(52) U.S. Cl. ............... 711/167; 711/112; 711/169
(58) Field of Classification Search ............... 711/167, 711/169, 111, 112, 113, 114; 712/214, 215, 712/23
    See application file for complete search history.

(56) References Cited

U.S. PATENT DOCUMENTS

| 5,058,033 | A | 10/1991 | Bonissone et al. ............ 706/52 |
| 5,513,148 | A | 4/1996 | Zagar ........................ 365/233 |
| 5,613,129 | A | 3/1997 | Walsh ........................ 710/267 |
| 5,630,096 | A | 5/1997 | Zuravleff et al. ............ 711/154 |
| 5,991,825 | A * | 11/1999 | Ng ................................ 710/6 |
| 6,170,042 | B1 | 1/2001 | Gaertner et al. ............ 711/158 |
| 6,397,066 | B1 | 5/2002 | Servi ........................... 455/446 |
| 6,515,819 | B1 * | 2/2003 | Schmidt et al. .......... 360/78.04 |
| 6,553,454 | B1 * | 4/2003 | Harada ....................... 711/111 |
| 6,654,852 | B1 * | 11/2003 | Kanamaru et al. .......... 711/113 |
| 6,842,801 | B1 * | 1/2005 | Yamada ....................... 710/56 |
| 2003/0093640 | A1 * | 5/2003 | Mowery et al. ............ 711/167 |
| 2003/0110357 | A1 * | 6/2003 | Nguyen et al. ............. 711/136 |
| 2003/0188092 | A1 * | 10/2003 | Heath et al. ................ 711/111 |

* cited by examiner

*Primary Examiner*—Brian R. Peugh
(74) *Attorney, Agent, or Firm*—David K. Lucente; Derek J. Berger

(57) ABSTRACT

A disc drive with a control processor programmed with an execution time dependent command schedule optimization method to effect data throughput with a host device. The disc drive includes a head disc assembly executing commands scheduled by the control processor. The control processor selects and schedules a next optimum command from among commands analyzed by the control processor during a time the head disc assembly is executing a current command. The steps utilized by the control processor to select and schedule the next optimum command include executing a first command with the head disc assembly, determining a computation time for a second command, storing the computation time as a computation time estimate, and using the stored computation time estimate to determine the number of commands in a command queue for analysis to provide a level of command schedule optimization commensurate with the available time.

13 Claims, 3 Drawing Sheets

EXECUTION TIME DEPENDENT COMMAND SCHEDULE OPTIMIZATION

RELATED APPLICATIONS

This application claims priority to U.S. Provisional Application No. 60/368,217 filed Mar. 28, 2002, entitled "Adaptive Precision Real-Time Method With Feedback."

FIELD OF THE INVENTION

This invention relates generally to the field of magnetic data storage devices, and more particularly, but not by way of limitation, command execution time dependent task optimization.

BACKGROUND

Disc drives are used for data storage in modern electronic products ranging from digital cameras to computers and network systems. Ordinarily, a disc drive includes a mechanical portion, or head disc assembly, and electronics in the form of a printed circuit board assembly mounted to an outer surface of the head disc assembly. The printed circuit board assembly controls functions of the head disc assembly and provides a communication interface between the disc drive and a host being serviced by the disc drive.

The head-disc assembly has a disc with a recording surface rotated at a constant speed by a spindle motor assembly and an actuator assembly positionably controlled by a closed loop servo system. The actuator assembly supports a read/write head that writes data to and reads data from the recording surface. Disc drives using magnetoresistive read/write heads typically use an inductive element, or writer, to write data to information tracks of the recording surface and a magneto resistive element, or reader, to read data from the information tracks during drive operations.

The disc drive market continues to place pressure on the industry for disc drives with increased capacity at a lower cost per megabyte and higher rates of data throughput between the disc drive and the host.

In real-time systems, there is often a need to complete a certain computation prior to a deadline, i.e., to complete a computation within a computation time estimate, such as determining an optimum schedule for a command queue prior to completion of an active command accessing the disc.

A computation time estimate is sometimes based upon measurements taken by the designers of the system, and those measurements are "hard-coded" into the system. If the characteristics of the system change at run-time (e.g. the CPU bandwidth allocated to the computations is different than the designers expected), estimates based on the original measurements may no longer be accurate. Furthermore, any time the system is modified (e.g. the CPU clock rate is increased), the computation time must be re-measured and the revised measurements hard-coded into the system.

Because of a growing ability of disc drives to adapt to their environment, continual pressure for improved data throughput and an understanding that in some cases it is desirable to provide a more precise result when time is available for extended computation, and to sacrifice precision for the sake of expediency when time does not allow for extended computation there is a need for improved methods to update and utilize computation time estimates. To achieve this, the system must be able to estimate how much time would be required for a particular computation on a real time basis.

As such, challenges remain and a need persists for improvements in data throughput between the disc drive and the host by reducing overall processor cycle time through computational task optimization to improve data throughput.

SUMMARY OF THE INVENTION

As exemplified by preferred embodiments, the present invention provides for improving data throughput between a host device and a disc drive. The disc drive has a control processor programmed with a command schedule optimization method to effect improved data throughput with the host device. The disc drive includes a head disc assembly executing commands scheduled by the control processor.

The control processor selects and schedules a next optimum command from among commands analyzed by the control processor during a time the head disc assembly is executing a current command.

The steps utilized by the control processor to select and schedule the next optimum command include executing a first command with the head disc assembly; determining a computation time for a second command; storing the computation time as a computation time estimate; and using the stored computation time estimate to determine the number of commands in a command queue for analysis to provide a level of command schedule optimization commensurate with the available time.

These and various other features and advantages, which characterize the present invention, will be apparent from a reading of the following detailed description and a review of the associated drawings.

DETAILED DESCRIPTION

Figure 1:
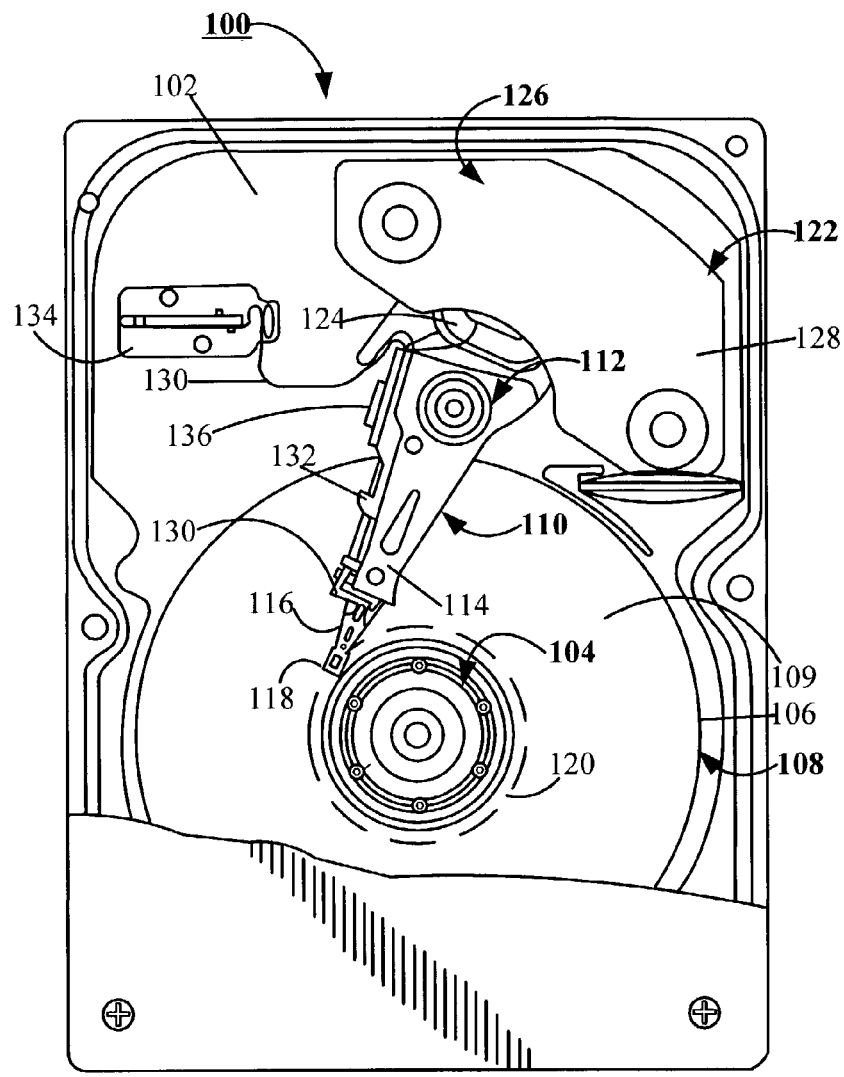
FIG. 1 is a top plan view of a disc drive that incorporates a command schedule optimization routine in accordance with a method of the present invention.

Referring to the drawings in general, and more particularly to FIG. 1, shown therein is a top view of a disc drive 100, also referred to herein as a data storage device, constructed in accordance with the present invention. Numerous details of and variations for the construction of the disc drive 100 are not included in the following description as such are well-known to those skilled in the art, and believed unnecessary for the purpose of describing the present invention.

The disc drive 100 includes a basedeck 102 supporting various data storage device components, including a spindle motor assembly 104 that supports one or more axially aligned rotatable discs 106 forming a disc stack 108, each disc 106 having at least one, and usually two, recording surfaces 109.

Adjacent the disc stack 108 is a head stack assembly 110 (also referred to as an actuator assembly) that pivots about a bearing assembly 112 in a rotary fashion. The actuator assembly 110 includes an actuator arm 114 that supports a load arm 116, which in turn supports at a read/write head 118 corresponding to the rotatable recording surface 109. The rotatable recording surface 109 is divided into concentric information tracks 120 (only one depicted) over which the read/write head 118 is positionably located.

The information tracks 120 support head position control information written to embedded servo sectors (not separately depicted). Between the embedded servo sectors are data sectors (not separately depicted) used for storing bit patterns or data. The read/write head 118 includes a reader element (not separately shown) offset radially and laterally from a writer element (not separately shown). The writer element writes data to the concentric information tracks 120 during write operations of the disc drive 100, while the reader element controls the positioning of the read/write head 118 relative to the concentric information tracks 120 during operations of the disc drives 100.

The terms "servoing" and "position-controlling," as used herein, mean maintaining control of the read/write head 118 relative to the rotating recording surfaces 109 during operation of the disc drive 100. Servoing to or on the information track 120, the actuator assembly 110 is controllably positioned by a voice coil motor assembly 122 (also referred to a primary actuator motor). The voice coil motor assembly 122 includes an actuator coil 124 immersed in a magnetic field generated by a magnet assembly 126. A pair of steel plates 128 (pole pieces) mounted above and below the actuator coil 124 provides a magnetically permeable flux path for a magnetic circuit of the voice coil motor 122.

During operation of the disc drive 100, current passes through the actuator coil 124 forming an electromagnetic field, which interacts with the magnetic circuit of the voice coil motor 122, causing the actuator coil 124 to move relative to the magnet assembly 126. As the actuator coil 124 moves, the actuator assembly 110 pivots about the bearing assembly 112, causing the read/write head 118 to move over the rotatable recording surface 109, thereby allowing the read/write head 118 to interact with the information tracks 120 of the recording surfaces 109.

To provide the requisite electrical conduction paths between the read/write head 118 and data storage device read/write circuitry (not shown), read/write head wires (not shown) of the read/write head 118 are affixed to a read/write flex circuit 130. The read/write flex circuit 130 is routed from the load arms 116 along the actuator arms 114 and into a flex circuit containment channel 132 and secured to a flex connector body 134. The flex connector body 134 supports the flex circuit 130 during passage through the basedeck 102 and into electrical communication with a printed circuit board assembly (PCBA) (not shown) mounted to the underside of the basedeck 102. The flex circuit containment channel 132 also supports read/write signal circuitry including preamplifier/driver (preamp) 136 used to condition read/write signals passed between the read/write circuitry and the read/write head 118. The printed circuit board assembly provides the data storage device read/write circuitry that controls the operation of the read/write head 118, as well as other interface and control circuitry for the disc drive 100.

Figure 2:
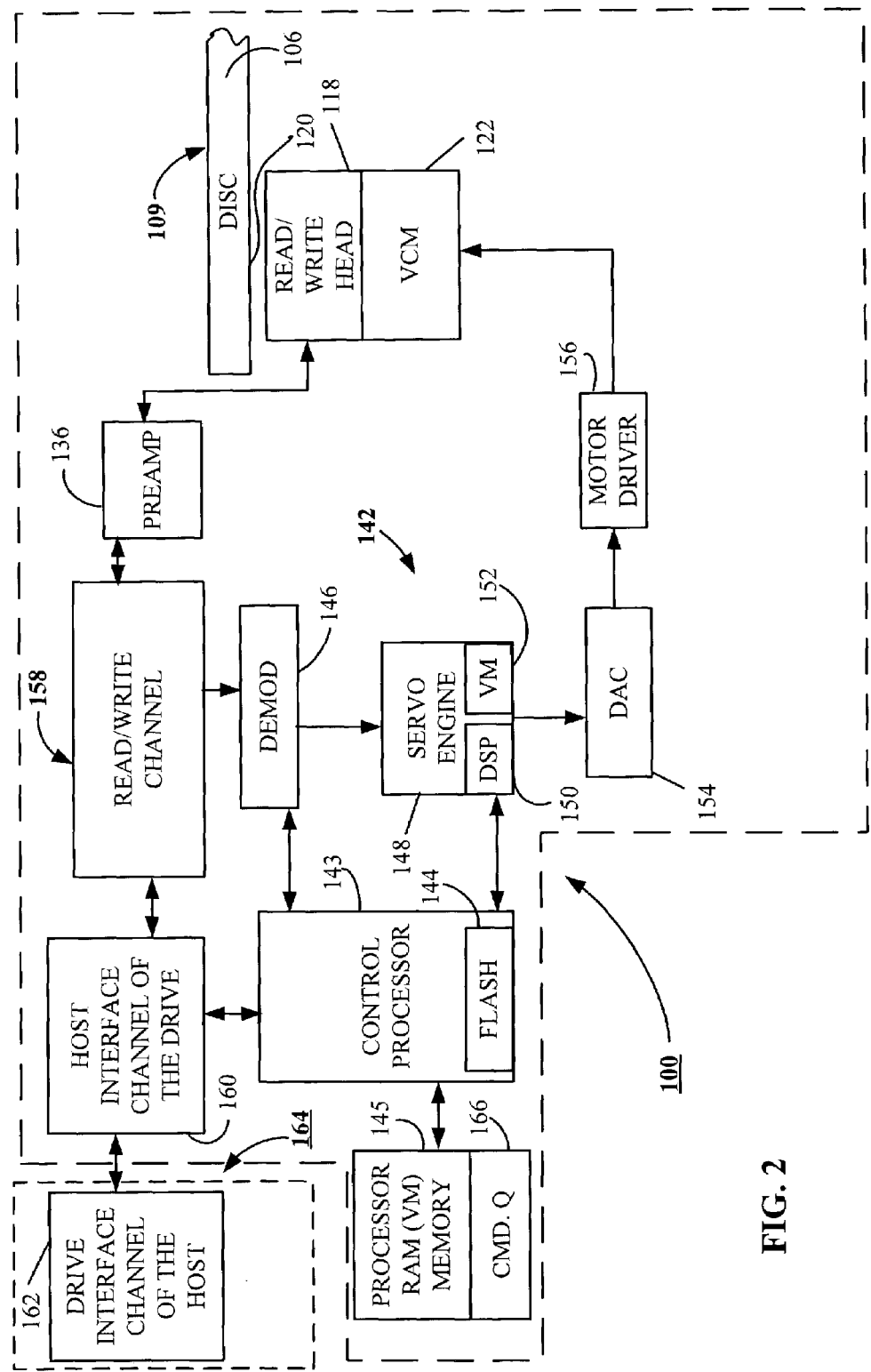
FIG. 2 is a functional block diagram of control circuitry of the disc drive of FIG. 1.

Turning to FIG. 2, position-controlling of the read/write head 118 is provided by the positioning mechanism (not separately shown) operating under the control of a servo control circuit 142 programmed with servo control code, which forms a servo control loop. The servo control circuit 142 includes a control processor 143 with a flash memory portion 144 for use by the control processor 143, a volatile memory or random access memory (VM) 145, a demodulator (demod) 146, an application specific integrated circuit (ASIC) hardware-based servo controller ("servo engine") 148 with a digital signal processor portion (DSP) 150 and a volatile memory or random access memory (VM) 152 portion, a digital to analog converter (DAC) 154 and a motor driver circuit 156. Optionally, the functions of the flash memory 144, the servo engine 148, the digital signal processor 150 and the volatile memory 152 may all be contained, along with random access memory 145, within the control processor 143.

A portion of the random access memory 145 is used as a cache for data read from the information track 120 awaiting transfer to a host connected to the disc drive 100 and for data transferred from the host to the disc drive 100 to be written to the information track 120. The components of the control circuit 142 are utilized to facilitate track following algorithms for the actuator assembly 110 (of FIG. 1) and more specifically for controlling the voice coil motor 122 in position-controlling the read/write head 118 relative to the selected information track 120 (of FIG. 1).

The demodulator 146 conditions head position control information transduced from the information track 120 of the rotatable recording surface 109 to provide position information of the read/write head 118 relative to the information track 120. The servo engine 148 generates servo control loop values used by the control processor 143 in generating command signals such as seek signals used by voice coil motor 122 in executing seek commands. Control loop values are also used to maintain a predetermined position of the actuator assembly 110 during data transfer operations.

The command signals generated by the control processor 143 are converted by the digital to analog converter 154 to analog control signals. The analog control signals are used by the motor driver circuit 156 in position-controlling the read/write head 118 relative to the selected information track 120, during track following, and relative to the recording surface 109 during seek functions.

The read element of the read/write head 118 responds to bit patterns written to the servo sectors as well as bit patterns written to the data sectors of the information track 120 by generating a signal, also referred to as a read signal. The signal is passed to the preamplifier 136, where the amplitude of the signal is increased and then passed to the read/write channel 158, which processes the signal and passes data contained within the signal to a host interface channel 160 of the disc drive 100 for transfer to a drive interface channel 162 of a communication bus of a host 164 (not shown separately).

In a preferred embodiment, the architectural environment of the disc drive 100 is a queued command environment. The control processor 143 controls a command execution time dependent task optimization method that improves utilization of the drive interface channel 162 of the host 164 and the host interface channel 160 of the disc drive 100 by determining within the time period of execution of a current command the next most optimum command for execution by the control processor 143. To achieve this, an estimate of the amount of time needed for a particular computational task is made.

In a preferred embodiment, the control processor 143 measures a computation time at run-time, stores the measured computational time in a volatile medium such as the processor RAM memory 145 as computation time estimates and uses the measured values for future computation time estimates. To commence the operation of storing the real-time computation time estimates, conservative "initial computation time estimate" values are provided to the system for use until it performs the in-situ measurements. This relieves the need to empirically measure computation time whenever the system is modified, and ensures that the measurements in use apply to the current run-time environment (e.g. a substantially real time prediction of the amount of CPU bandwidth needed for a computation is provided by the system rather than an empirically determined value).

Figure 3:
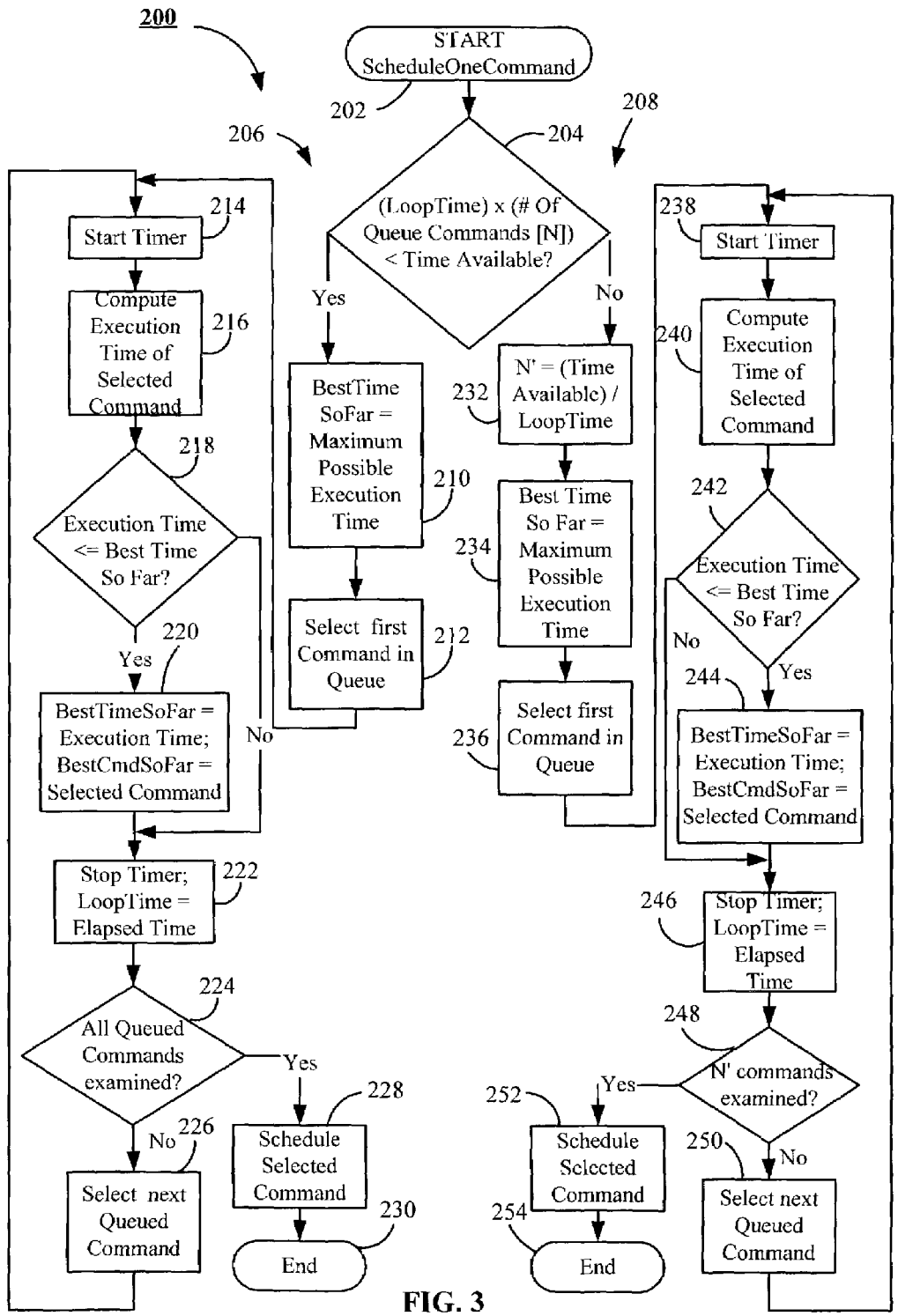
FIG. 3 is a flow chart of a method for executing the command schedule optimization routine of the disc drive of FIG. 1.

FIG. 3 depicts command schedule optimization process 200 of a schedule one command routine of a preferred embodiment for determining a most optimum command for execution by the disc drive 100 based on a selection made from among commands analyzed in a command queue 166 (of FIG. 2). A determination of the most optimum next command is made during a time for execution of a current command by the disc drive 100.

If sufficient time is available, all commands in the command queue 166 are analyzed and the most optimum command for execution is identified and scheduled as the next command to be executed by the disc drive 100. If insufficient time is available to analyze all commands present in the command queue 166, a determination of the number of commands in the command queue 166 that can be analyzed during the available time is made and the most optimum command from among the commands analyzed is identified and scheduled as the next command to be executed by the disc drive 100.

The command schedule optimization process 200 commences with start schedule one command process step 202 and proceeds to process step 204. At process step 204, an amount of time needed to perform a calculation task (such as selecting the next most optimum command) is compared to time available for performing the calculation task. In a preferred embodiment, the amount of time needed to perform the calculation task is determined by factoring a loop time by the number of commands in the command queue 166.

Loop time, also referred to herein as a computation time estimate, is an amount of time needed to determine an execution time for a selected command in the command queue 166 in addition to time expended to determine whether or not the selected command is the best command to be executed next by the disc drive 100. In a preferred embodiment, the loop time for each command in the command queue 166 is taken to be substantially the same. In performing process step 204, the control processor 143 reads a loop time from the processor RAM memory 145 for use in determining the amount of time needed to perform the calculation task. The loop time stored in the processor RAM memory 145 is overwritten with the actual amount of time taken to analyze the last analyzed command while determining the best command for execution, which then becomes the loop time stored in the processor RAM memory 145 for subsequent use. The amount of time available to perform the calculation task is substantially the execution time for a command currently being executed by the disc drive 100.

For example, when the command currently being executed by the disc drive 100 is a read data command, the control processor 143 commands the servo engine 148 to execute an appropriate seek, and instructs the read/write channel 158 to interpret the data read by the read/write head 118. The time taken by the servo engine 148 in the read/write channel 158 to execute the command is the time available for the control processor 143 to identify and schedule a most optimum command selected from a plurality of commands in the command queue 166 as the next command for execution by the disc drive 100.

When the time available is greater than the amount of time needed to examine all commands in the command queue 166, the command schedule optimization process 200 proceeds along a first process branch 206 of the command schedule optimization process 200. However, if the amount of time available is less than the amount of time needed to examine all commands in the command queue 166, the command schedule optimization process 200 proceeds along an alternate process branch 208. In either case, the calculation task to be processed by the control processor 143 is to select and schedule, from among the commands analyzed, the next command that should be executed to maximize throughput for the disc drive 100, i.e., the command that would yield the minimum execution time.

When the time available for performing the calculation task is greater than the time needed to perform the calculation task, the command schedule optimization process 200 proceeds along the process branch 206 with process step 210. At process step 210, a maximum execution time, such as a full stroke seek plus a full disc revolution, is assigned to be a best time so far. In other words, a first best time so far is selected to be a time that each calculated access time for each command in the command queue 166 will be less than.

At process step 212, the first command in the command queue 166 is selected for analysis to determine the execution time of the selected command and a timer is set at process step 214. At process step 216, a calculation of the execution time embodied by the selected command is made. At process step 218, a comparison is made between the calculated execution time determined at process step 216 and the best time so far of process step 210.

At process step 220, if the calculated execution time of process step 216 is less than or equal to the best time so far of process step 210, the calculated execution time of process step 216 becomes the best time so far. At that point in the process, the best command so far is the command selected for analysis. Because the best command so far has been identified, a pointer is set to the selected command and the command schedule optimization process 200 advances to process step 222. At process step 222, the timer initialized at process step 214 is stopped and the elapse time encountered processing the selected command through process steps 214 through 222 is written into the processor RAM memory 145 as the new loop time.

Process step 224 continues the command schedule optimization process 200 by querying whether each command in the command queue 166 has been examined. If there are commands remaining in the command queue 166 that have not been examined, the next command is selected at process step 226, the command schedule optimization process 200 loops back to process step 214 and proceeds with the calculation, comparison and set pointer operation, as appropriate, of process steps 216, 218 and 220 for the next selected command.

At process step 218, if the next selected command is not better than the first selected command, i.e., having a better execution time than the first selected command, process step 220 is skipped and the pointer remains set at the first selected command. The command schedule optimization process 200 continues to loop until each command in the command queue 166 has been examined.

By looping through the first process branch 206, the best command of the available commands in the command queue 166 is scheduled as the next command to be executed. At process step 228, with the elapse time for the best command stored as the loop time in the processor RAM memory 145 at process step 222, the best command is scheduled for execution and the command schedule optimization process 200 concludes at process step 230.

For instances where the loop time factored by the number of commands in the command queue 166 is greater than the time available, the command schedule optimization process 200 proceeds along the alternate process branch 208 beginning with process step 232. At process step 232, the number of commands N' of the total number of commands N in the command queue 166 that can be analyzed during the time available is determined.

To determine the number of commands N' that can be evaluated, the time available is factored by the loop time read from the processor RAM memory 145. Once the number of commands to be examined has been determined, the command schedule optimization process 200 proceeds to process step 234. At process step 234, a maximum execution time, such as a full stroke seek plus a full disc revolution, is assigned to be a best time so far. At process step 236, the first command of the N' commands determined by process step 232 is selected for analysis and a timer is initialized at process step 238.

At process step 240, a calculation of the execution time embodied by the first command of the N' commands selected by process step 232 is made. At process step 242, a comparison is made between the calculated execution time determined at process step 240 and the best time so far of process step 234.

At process step 244, if the calculated execution time of process step 240 is less than or equal to the best time so far of process step 234, the calculated execution time of process 240 becomes the best time so far, the best command so far is the first command of the N' commands determined by process step 232, a pointer is set to the selected command and the command schedule optimization process 200 advances to process step 246.

At process step 246, the timer of process step 238 is stopped and the loop time saved in the processor RAM memory 145 is replaced with the elapse time encountered by the control process 143 processing the selected command through process steps 238 through 246. The elapse time becomes the new loop time for subsequent use.

Process step 248 continues the command schedule optimization process 200 by querying whether each command of the selected N' commands has been examined. If there are commands remaining in the N' commands selected within command queue 166 that have not been examined, the next command of the N' commands is selected at process step 250. The command schedule optimization process 200 loops back to process step 238 and proceeds with the calculation, comparison and set pointer operation of process steps 240, 242 and 244 for the next selected command.

At process step 242, if the next selected command of the N' commands is not better than the first selected command of the N' commands, i.e., having a better execution time than the first selected command, process step 244 is skipped and the pointer remains set at the first selected command of the N' commands. The command schedule optimization process 200 continues to loop until each command of the N' commands selected within the command queue 166 has been examined.

By looping through the alternate process branch 208 the best command of the selected N' commands in the command queue 166 is scheduled as the next command to be executed. At process step 252, with the elapse time for the best command stored as the loop time in the processor RAM memory 145 at process step 252, the best command is scheduled for execution and the command schedule optimization process 200 concludes at process step 254.

Figure 4:
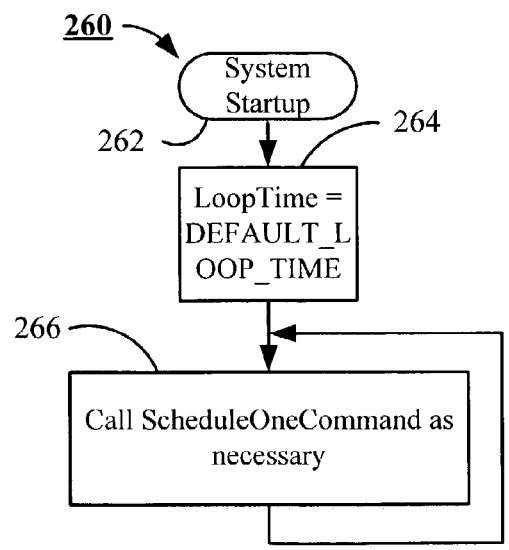
FIG. 4 is a flow chart of a method for calling the command schedule optimization routine of the disc drive of FIG. 1.

FIG. 4 depicts a system initialization process 260 beginning with system startup step 262. At process step 264, an empirically determined loop time is loaded into the processor RAM memory 145 as an initial system set up value. In a preferred embodiment, as commands are received by the host interface channel of the disc drive 100 of FIG. 2 from the drive interface channel 162 of the host 164 of FIG. 2, the control processor 143 stores the commands in the command queue 166.

With the commands loaded into command queue 166, a system initialization process 260 calls the schedule one command routine of the command schedule optimization process 200 of FIG. 3 at process step 266. As long as commands are present for execution by the disc drive 100, the command schedule optimization process 200 of FIG. 3 remains active. Once all commands in the command queue 166 have been processed, the command schedule optimization process 200 is placed inactive and remains inactive until called upon.

Accordingly, embodiments of the present invention are directed to improving data throughput for a storage apparatus. In accordance with one embodiment, steps of executing a first command (such as 262) with a system (such as 100), determining an execution time for a second command (such as 261), storing an elapse time for determining the execution time for the second command as a computation time estimate (such as 222); and accessing the stored computation time estimate to process a computation task (such as 266) with a control processor (such as 143) to a level of optimization permitted within the execution time of the first command are part of a method for improving data throughput of the storage apparatus.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the appended claims.

What is claimed is:

1. A method comprising steps of estimating an execution time required to execute a command by a system while determining a computation time value comprising the elapsed time required to arrive at the estimated execution time, and using the computation time value to optimize execution order of a plurality of pending commands.

2. The method of claim 1, in which the system is a data storage device.

3. The method of claim 1, in which the estimating step and the using step are carried out during execution of a first command by the system.

4. The method of claim 1, in which execution of each said pending command comprises movement of a data transducer to an associated position adjacent a data storage medium to provide a data transfer operation with said medium.

5. The method of claim 1, in which the computation time value is determined by steps comprising:
   starting a timer;
   computing the time for the system to execute the command; and
   stopping the timer.

6. The method of claim 1, in which the using step comprises using the computation time value to determine the associated number of said pending commands that can be evaluated during execution of a first command by the system.

7. The method of claim 6, wherein the associated number of said pending commands that can be evaluated during execution of a first command by the system is less than a total number of said pending commands.

8. The method of claim 1, wherein the using step further comprises determining an associated estimated execution time for each said pending command, and identifying the associated pending command with the lowest estimated execution time as the next command to be executed.

9. An apparatus comprising:
a data transducer adapted to access a data storage medium; and
a control processor controlling operation of said transducer, the control processor programmed to estimate an execution time required to execute a data access command, to determine a computation time value as the elapsed time required to obtain the estimated execution time, and to use the computation time value to optimize execution order of a plurality of pending data access commands.

10. The apparatus of claim 9, in which in the control processor carries our said programming during execution of a first data access command to move the data transducer to a selected position adjacent the storage medium.

11. The apparatus of claim 9, in which the control processor further selects an optimum data access command from said plurality of commands by steps comprising:

determining an amount of time to process the plurality of commands with the control processor based on the computation time value;

processing a portion of the plurality of commands during execution of a first command when the amount of time to process the plurality of commands is greater than a time required to complete the execution of the first command; and identifying from among the portion of the plurality of commands processed a command having a lowest time for execution as the optimum command.

12. An apparatus comprising:
a command queue configured to store a plurality of pending commands; and
first means for selecting an optimum order for execution of said pending commands by estimating an execution time required to execute a selected command while determining a computation time value comprising the elapsed time required to arrive at the estimated execution time, and using the computation time value to select said optimum order.

13. The apparatus of claim 12, wherein each said pending command comprises a data access command to move a data transducer to an associated position adjacent a data storage medium to carry out a data transfer operation with said medium.

* * * * *